United States Patent [19]

Feitelson et al.

[11] Patent Number: 5,877,764
[45] Date of Patent: Mar. 2, 1999

[54] GRAPHICAL USER INTERFACE FOR MANAGING TEXT I/O BETWEEN A USER AND A PARALLEL PROGRAM

[75] Inventors: Dror Gershon Feitelson, Bronx; Blake Gordon Fitch, New Rochelle; Mark Edwin Giampapa, Irvington, all of N.Y.

[73] Assignee: International Business Machines Corporation, Armonk, N.Y.

[21] Appl. No.: 965,590

[22] Filed: Oct. 23, 1992

[51] Int. Cl.$^6$ ........................................ G06F 3/14
[52] U.S. Cl. ..................... 345/347; 345/966; 345/975; 345/349; 345/348
[58] Field of Search ................... 395/161, 159, 395/157, 155, 156, 144, 163, 650, 800, 680, 682, 800.29, 800.1, 800.16; 345/347, 975, 966, 970, 348, 349, 354

[56] References Cited

U.S. PATENT DOCUMENTS

| | | | |
|---|---|---|---|
| 4,713,656 | 12/1987 | Cliff et al. | 345/352 X |
| 4,858,152 | 8/1989 | Estes | 345/431 X |
| 4,903,218 | 2/1990 | Longo et al. | 345/340 X |
| 5,036,315 | 7/1991 | Gurley | 345/340 |
| 5,168,554 | 12/1992 | Luke | 345/963 X |
| 5,237,653 | 8/1993 | Noguchi et al. | 345/348 X |
| 5,353,399 | 10/1994 | Kuwamoto et al. | 345/349 |
| 5,388,268 | 2/1995 | Beach et al. | 345/966 X |

*Primary Examiner*—Raymond J. Bayerl
*Assistant Examiner*—L. Kinard
*Attorney, Agent, or Firm*—Ronald L. Drumheller

[57] ABSTRACT

An I/O control window is created on a user's terminal screen when a parallel program is executing. The I/O control window displays an array of graphical elements (preferably small colored squares), which are partitioned into groups of one or more such elements, each partition representing a task (or thread) of the parallel program. In each partition there is one graphical element which represents the I/O status of the task or thread represented by that partition and is called an I/O status indicator. Each I/O status indicator is capable of assuming any one of several different graphical states (each graphical state preferably being a color for the graphical element), one of which indicates that the corresponding task or thread has provided text output that has not been displayed to the user yet and another of which indicates that the corresponding task (or thread) is requesting text input from the user. The user can open a text window on the user's terminal screen which is dedicated for I/O with a particular task (or thread) by placing a mouse on a graphical element in the I/O control array partition representing that particular task (or thread) and pressing a specified mouse button. Many separate I/O windows like this may be opened at the same time and any I/O window can be closed as well through use of the mouse.

26 Claims, 9 Drawing Sheets

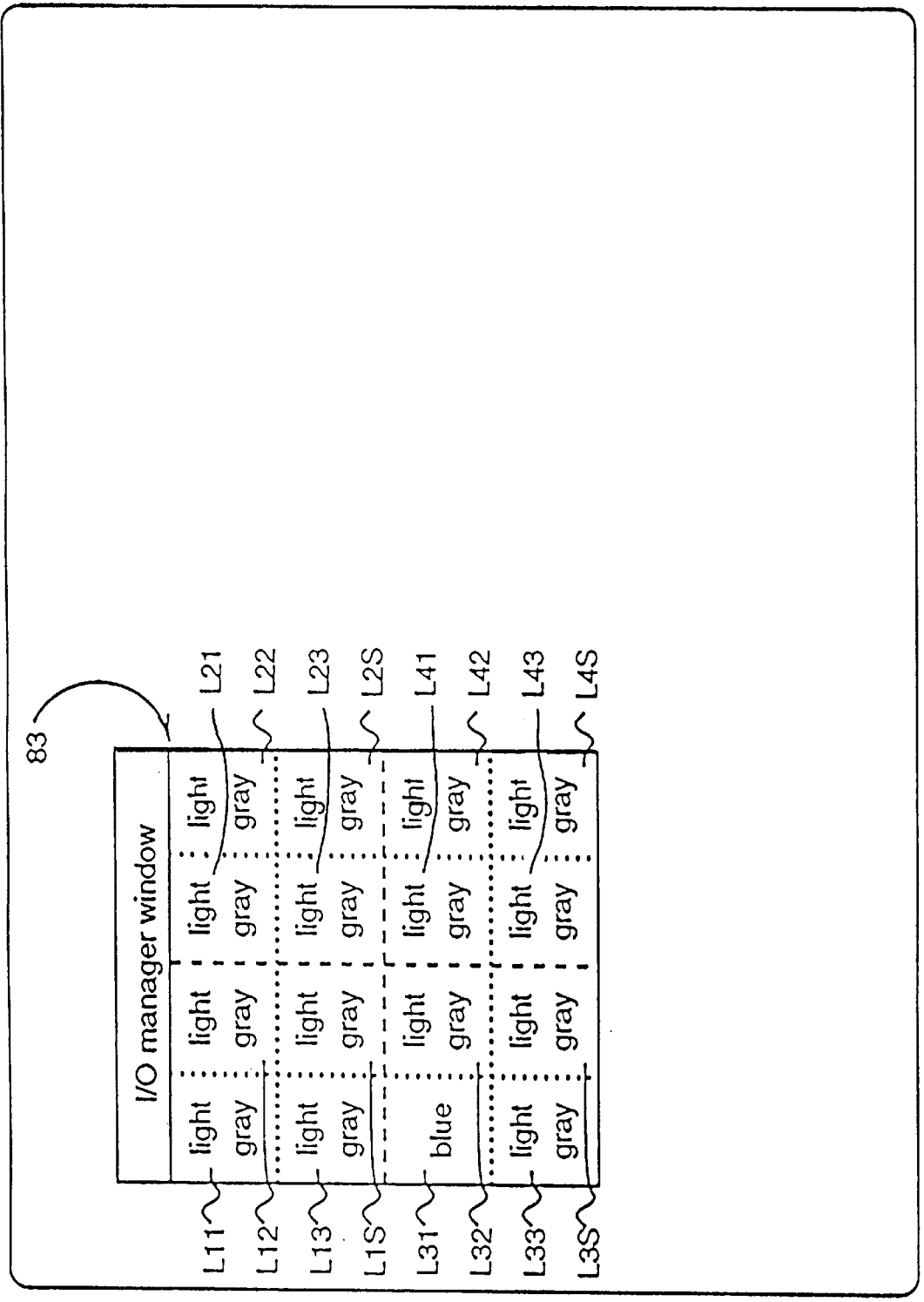

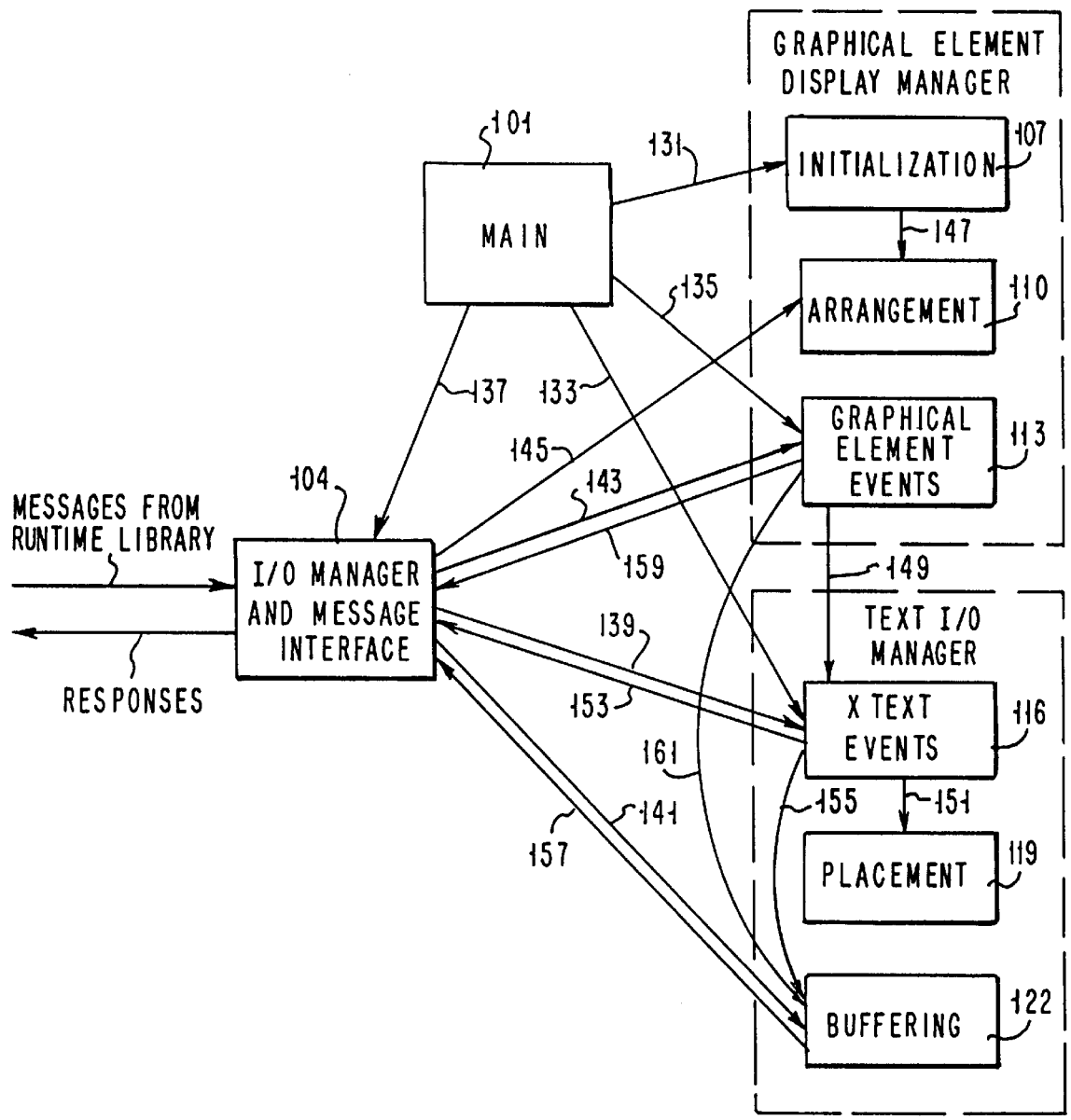

GRAPHICAL USER INTERFACE FOR MANAGING TEXT I/O BETWEEN A USER AND A PARALLEL PROGRAM

FIELD OF THE INVENTION

This invention generally relates to parallel processing and more specifically to the text input/output (I/O) interface between a user of a parallel program and the parallel program itself, especially when the parallel program is of the massively parallel type.

BACKGROUND OF THE INVENTION

Massively parallel multiprocessors are computers with hundreds or even thousands of processors. One of the main problems in using such machines is how to implement interactions between a running program and a user, and specifically, how to implement terminal input and output (I/O) of text information. Textual input is complicated by the fact that the user might need to control the routing of the typed input to a certain processor. Textual output can be a problem because the user might be flooded by independent output streams from all the processors, which might number in the hundreds or even thousands of processors. Regrettably, humans by nature can only concentrate on one data stream at a time. Most parallel processing systems do not provide any special support for terminal I/O. Hence when many processors generate output, these output streams are interleaved by the system and presented to the user as one stream. If this is the case, the programmer must add processor identification tags to the outputs, and the user must then sift through the output to search for those parts that were generated by a particular processor. FIG. 1 illustrates such a conventional interleaved text output stream with output in uppercase and input in lower case.

Input requires even more work. When many processors request input, they are served in an unspecified order. Therefore the programmer must designate a particular processor that will receive all the user text input. That particular processor must then send the user text data to the relevant processor according to instructions received from the user as part of the input.

In the Express system marketed by ParaSoft Corp., the terminal I/O problem is reduced to some extent by limiting the semantics of I/O so as to reduce the number of possible I/O patterns. For example, both input and output can be done in "single" mode or in "multi" mode. In the case of output, single mode means that all the processors must output exactly the same text. This is checked by the system, and then only one copy of the output is displayed to the user. For input, it means that all the processors get copies of the same thing. Output in multi mode means that each processor buffers its output internally, until they all agree to "flush". The outputs from the different processors are then displayed to the user one after the other, according to the numerical order of the processors. For input, multi means that the input requests are serviced in sequence one after the other. A major drawback of this approach is that it limits the patterns of I/O, and more specifically that it requires that the processors always synchronize in order to perform I/O.

An alternative approach is described by J. E. Lumpp et al. in "CAPS: A Coding Aid for PASM," Comm. ACM, Vol 34, No. 11, pp. 104–117 (November 1991), where separate windows are provided to all processors in a partition. While this decouples the I/O operations of different processors, it does not scale up very well for a large number of processors in a partition. If the number of processors is large (say a hundred processors in a partition), it is clearly very awkward to manage the display screen (having a hundred windows). The situation becomes unmanageable for a massively parallel partition that might contain thousands and even potentially tens of thousands of processors.

While graphical user interfaces have been provided for a user to monitor and debug a parallel program, typically in an analysis phase done after the execution phase in which monitored data is collected, no serious attention has been given yet to the problem of providing graphical support to the user during the time that a parallel program is running for text I/O at a user terminal.

SUMMARY OF THE INVENTION

It is an object of this invention to provide a simple-to-use terminal I/O facility for a user executing a parallel application on a massively parallel multiprocessor.

It is also an object of this invention to allow a user to control which text output from a parallel program executing on a massively parallel multiprocessor will be displayed to the user, if any.

A further object is to allow a user to conveniently control which of the processors in a massively parallel multiprocessor receive input that is typed in at the user's terminal.

Still another object is to provide a user of a massively parallel multiprocessor with cues that inform the user when more text output is available for display and when text input is being requested.

These and further objects are achieved in accordance with this invention by creating an I/O control window on the user's terminal screen when a parallel program is executing. The I/O control window displays an array of graphical elements. The graphical elements are partition into groups of one or more graphical elements per group. Each partition represents a task (or thread depending upon the definition of task and/or thread) of the parallel program.

In each partition there is one graphical element which represents the I/O status of the task or thread represented by that partition of the array of graphical elements. These graphical elements in the array have been called I/O status indicators. If there are graphical elements in the array in addition to the I/O status indicators (which is optional but preferred), the additional graphical elements serve a different function. These additional graphical elements are the subject of a separate patent application filed on the same day as this application and by the same inventors entitled "COMPACT GRAPHICAL PARALLEL PROGRAM USER OUTPUT INTERFACE CONTROLLED DIRECTLY BY THE PARALLEL PROGRAM," Ser. No. 07/965,591.

Each of the I/O status indicators in the I/O control array is capable of assuming any one of several different graphical states. One of these graphical states indicates that the task (or thread) represented by that I/O status indicator has provided text output that has not been displayed to the user yet. Another of these graphical states indicates that the task (or thread) represented by that I/O status indicator is requesting text input from the user. There is also one or more possible graphical states indicating that neither of these conditions is true. Different graphical states may be used, for example, to indicate that a task (or thread) is running (i.e., started and not terminated yet) or not running (i.e., not started yet or already terminated).

Preferably the I/O status indicators (and any other graphical elements in the I/O control array as well) are each small geometrically shaped areas on the user's screen (preferably each a square) and the different graphical states are each represented by a different color for the small area on the screen representing the I/O status indicator or other graphical element. An I/O control array such as this looks to the user like an array of color-coded LEDs (called VLEDs in the description of a preferred embodiment). If each task (or thread) of the parallel program runs on a separate processing element in a parallel processing system, the graphical element partition representing each task (or thread) also represents a separate processing element.

In accordance with this invention, the ;user can open a text window on the user's terminal screen which is dedicated for I/O with a particular task (or thread) by placing a mouse on a graphical element in the I/O control array partition representing that particular task (or thread) and pressing a specified mouse button. Many separate I/O windows like this may be opened at the same time and any I/O window can be closed as well through use of the mouse.

This invention particularly improves upon prior art systems by providing a way for a user to control which tasks (or threads or processors) have I/O windows and by providing a user with cues as to when it is beneficial to open additional windows. By providing I/O status indicators in an array which can be scaled up to provide I/O status information for thousands of tasks (or threads or processors) in a small area of the user's terminal screen, this invention allows a user to manage text I/O with a massively parallel program in a flexible and convenient way.

BRIEF DESCRIPTION OF THE DRAWINGS

The invention will now be described in more detail with reference to drawings in which:

FIG. 8 is an illustrative view of a user display screen having an I/O window that contains both I/O status indicator VLEDs and other VLEDs; and FIG. 9 is a detailed block and flow diagram of the structure of an I/O manager in accordance with this invention.

DETAILED DESCRIPTION

The present invention is preferably implemented with software programs running on a hardware computer system platform. A suitable hardware platform will be described first as well as suitable system software needed to implement this invention. Since most manufacturers of workstations offer an X system environment with their workstation, an X system environment is assumed as a base for this invention. Next, the operation of an illustrative example of this invention will be described in detail in order to describe various features. Finally, a more detailed description of a preferred implementation of this example with software will is described.

Hardware and Software Platform

Figure 1:
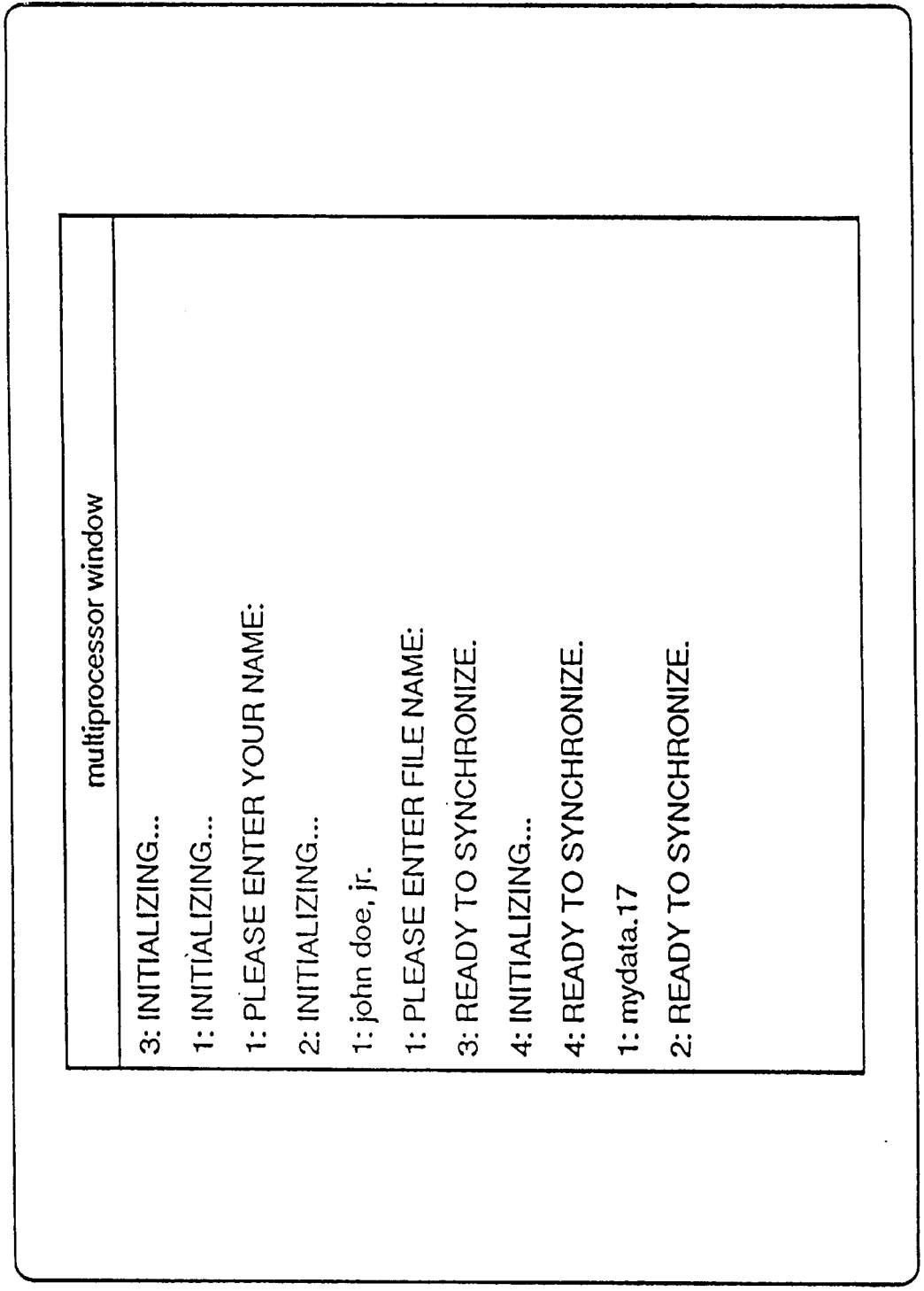
FIG. 1 illustrates a prior art I/O display in which the text I/O with respect to multiple processors is interleaved.
Figure 2:
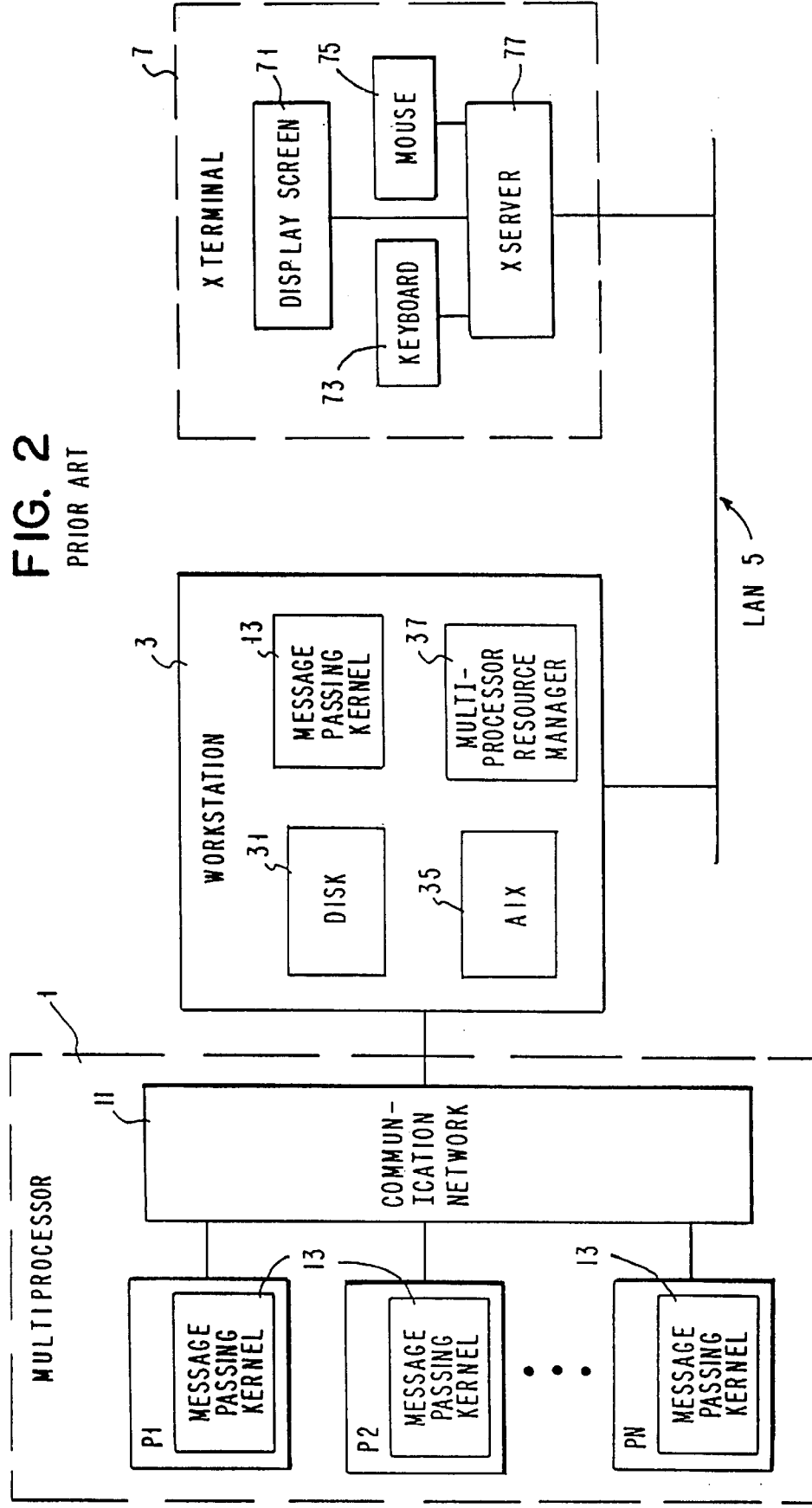
FIG. 2 is a block diagram of a prior art platform on which the present invention may be implemented.

A hardware platform and basic system software suitable for implementing this invention are shown in FIG. 2. A multiprocessor 1 is composed of N processors P1, P2 ... PN connected by a communication network 11. Each processor has some local memory, and there may be global memory as well. Prior to loading user programs, the only software on these processors is a message-passing kernel 13. This provides message passing services for application programs.

A workstation 3 is also connected to the multiprocessor's communication network. To be able to communicate with the multiprocessor's processors, it also has a copy of the message-passing kernel 13. Alternatively, the workstation could be connected to a local area network (LAN) which is connected to the multiprocessor's network. In this case, the communication protocol between the workstation and the multiprocessor's processors would be more complicated. The workstation has a disk 31 that is used to store object files of parallel programs, and other files. Alternatively, the workstation could be diskless, and be connected to a file server via a LAN. The workstation runs some suitable operating system such as AIX (an IBM product). One of the processes running on the workstation is the multiprocessor resource manager 37, which takes care of the allocation of processors to parallel programs. Alternatively, the resource manager could run on the multiprocessor itself or on another workstation, connected to this one by a LAN.

The workstation is connected by a LAN 5 to an X terminal 7. Alternatively, the workstation console could be used as a display terminal for the user. The X terminal provides an X windows system graphical environment for the user interface. Alternatively, another windowing system could be used. The X terminal includes a display screen 71, a keyboard 73, and a mouse 75. The only software running on the X terminal is an X server 77. It communicates with X clients running on the workstation 3 over the LAN 5 using the X protocol.

A short description of the X system will be given now in order to introduce terminology that will be used below. Programs that use the X windows user interface are called X clients. These are normal application programs that are linked with the X runtime library and call functions from this library to create and use the desired graphical interface. For example, there are functions to create a window, to resize a window, to draw on a window, to write to a window, and to close a window. The functions communicate with the X server to produce the desired effect.

Input from the user to the program is handled by callbacks. Callbacks are functions in the application program, not the X library. During the startup phase, the application attaches callbacks to various X events. Events are actually user actions; for example, if the user types text into a window, presses a mouse button, or causes a window to be exposed, these are events. After startup, the client application typically enters the main loop. In this loop, it continually calls an X library function that asks the X server if any new events have occurred. If an event had occurred, it is executed, which typically means that the attached callback function is called. For example, if the user presses a mouse button, the X server sends this event to the X library. The next time that the application does the main loop and asks for new events, this event will be executed. In effect, this will call the application callback function that was designated for handling of "button pressed" events. This function does whatever the application should do in response to the button being pressed. This could involve sending additional instructions to the X server, e.g. to open another window.

Startup For Parallel Program Execution

Figure 3:
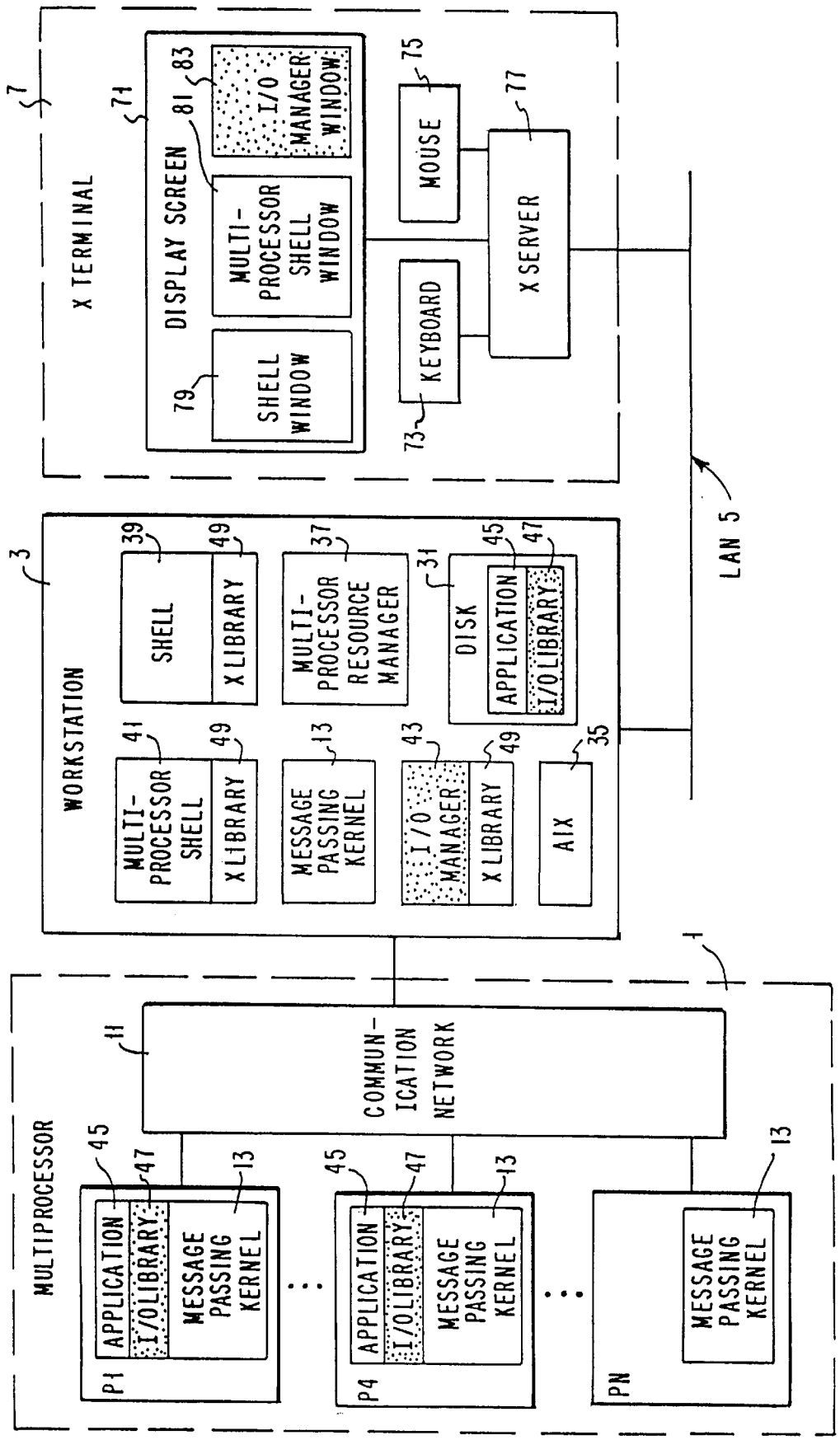
FIG. 3 is a block diagram of the FIG. 2 platform with the parts added in accordance with this invention being shaded.

Referring now to FIG. 3, initially the user is logged on the workstation 3 from the X terminal 7. This means that a shell X client 39 linked with the X library 49 is running on the workstation ready to accept commands entered through its window 79 on the X terminal display 71. The user types the command to start a session with the multiprocessor in this window. This action invokes a callback in the shell, which interprets the command. It then executes the command, and creates a new X client that will serve as the multiprocessor shell 41. Naturally, this too is linked with the X library 49. The multiprocessor shell calls one X library function to create a connection with the X server, and then calls another function to create a new window for itself. This request is sent to the X server, which creates the window 81.

When the multiprocessor shell window 81 appears, the user uses the mouse 75 to shift focus to that window. Then the user types in the command requesting a partition of the multiprocessor. This action invokes a callback in the multiprocessor shell 41, which interprets the command. For concreteness of the example, we assume that a partition of four processors has been requested. The multiprocessor shell then interacts with the multiprocessor resource manager 37 to acquire the requested number of processors on behalf of the user. Alternatively, processors could be shared among a number of users at a time, rather than each user having a dedicated partition.

Up to this point, the described system is a conventional X system, but now the user starts up an I/O manager, which is a new component in this X system and is used to implement the described embodiment of this invention. The I/O manager and any other new parts added by this invention to a conventional X system have been shaded for clarity. To start up the I/O manager, another command is typed into the multiprocessor shell window 81. Again, this action invokes a callback in the multiprocessor shell 41, which interprets the command. Consequently, the multiprocessor shell creates a new X client that will serve as the I/O manager 43. Naturally, this too is linked with the X library 49. Alternatively, the I/O manager could be started up automatically by the multiprocessor shell, without waiting for a special command to this effect. The I/O manager calls the X library function to create a connection with the X server, and then the function to create a new window for itself. This request is sent to the X server, which creates an I/O manager window 83. This window is also referred to below as the VLED display.

Finally, it is time to load and execute a parallel program. To do so, the user types the "load" command and the name of the program's object file in the multiprocessor shell window 81. As before, this action invokes a callback in the multiprocessor shell 41, which interprets the command. The multiprocessor shell first finds the program 45 in the workstation's disk 31 (or, alternatively, requests it from a file server over a LAN). Note that this is the object file, after the program had been compiled and linked. Among other things, this included linking with an I/O runtime library 47 that is used to interact with the I/O manager 43, as described below. The multiprocessor shell then uses the message passing kernel 13 to download the program onto the multiprocessor's processors, and create a copy in each one. Again, this includes both the program 45 itself and the I/O runtime library 47. Note that the program is only loaded on the processors in the user's partition.

Once loaded, the program starts execution. A detailed example of how it interacts with the I/O manager will be described next.

DETAILED DESCRIPTION OF THE OPERATION

Figure 4:
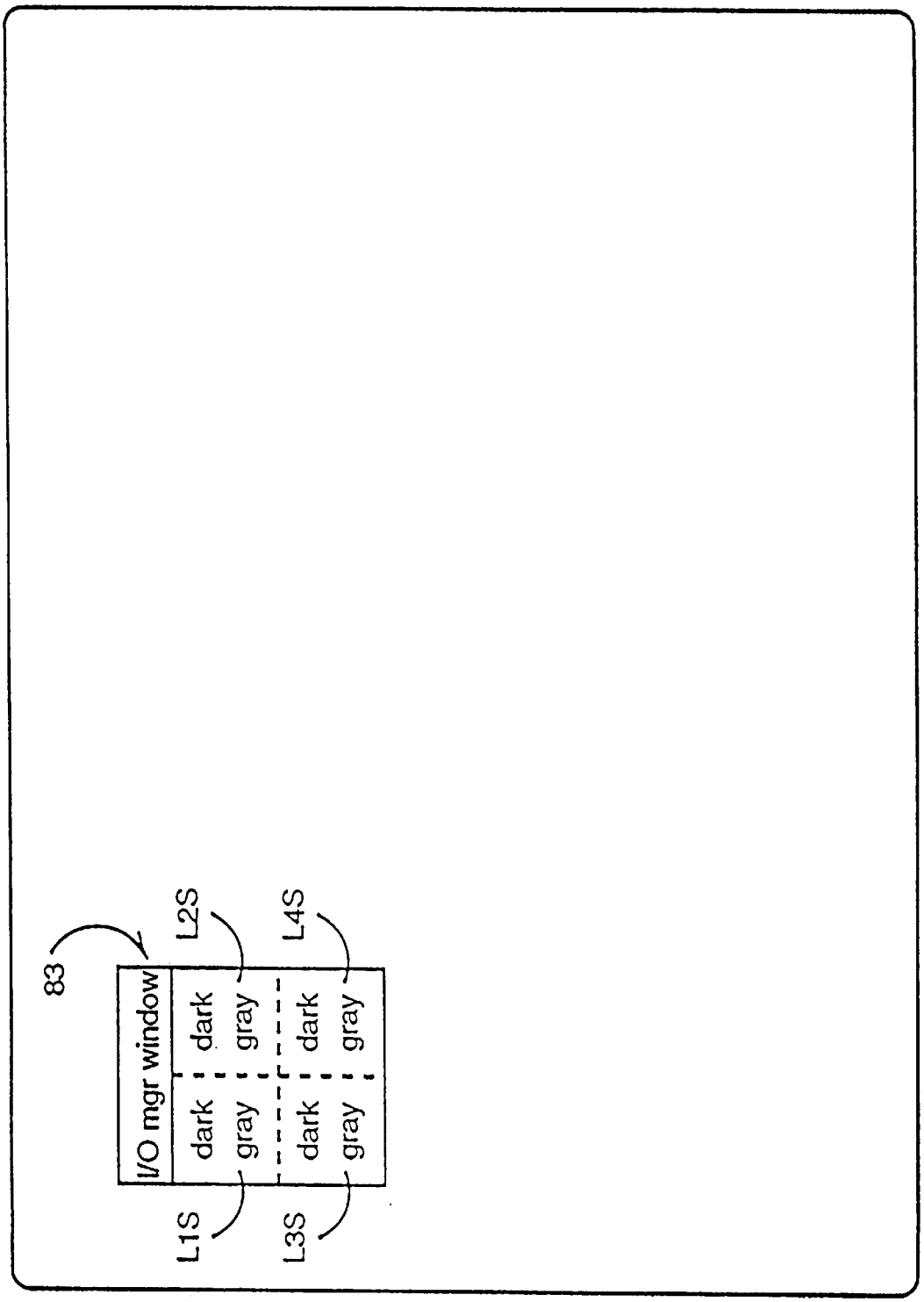
FIG. 4 is an illustrative view of a user display screen having an I/O window that contains I/O status indicators in accordance with this invention.

In the described example, when the I/O manager's window appears, it looks like element 83 in FIG. 4 (in FIGS. 4–8, the shell windows are not shown for clarity). The illustrated I/O manager's window contains 4 graphical elements.

In this implementation the graphical elements are colored geometrical areas (shown as squares) dividing up the main area of the window. We have generally named these graphical elements VLEDs (for virtual LEDs) because they look like colored light emitting diodes to a user. As will become more apparent as this description proceeds there may be VLEDs in this window which serve separate functions. For sake of clarity, FIG. 4 only illustrates VLEDs that serve the principal function of this invention, which is I/O status indication. VLEDs which serve this principal function are also called I/O status indicators in this description. Each I/O status indicator in this example represents one of the four processors in the user's partition (or more specifically the one task or thread running on that processor), since it is assumed that each processor has only one task or thread running on it. The VLEDs are identified as L1S, L2S, L3S, and L4S. They are colored dark gray, which signifies in this example that they represent tasks (or processors) but that the represented tasks are not running yet.

Figure 5:
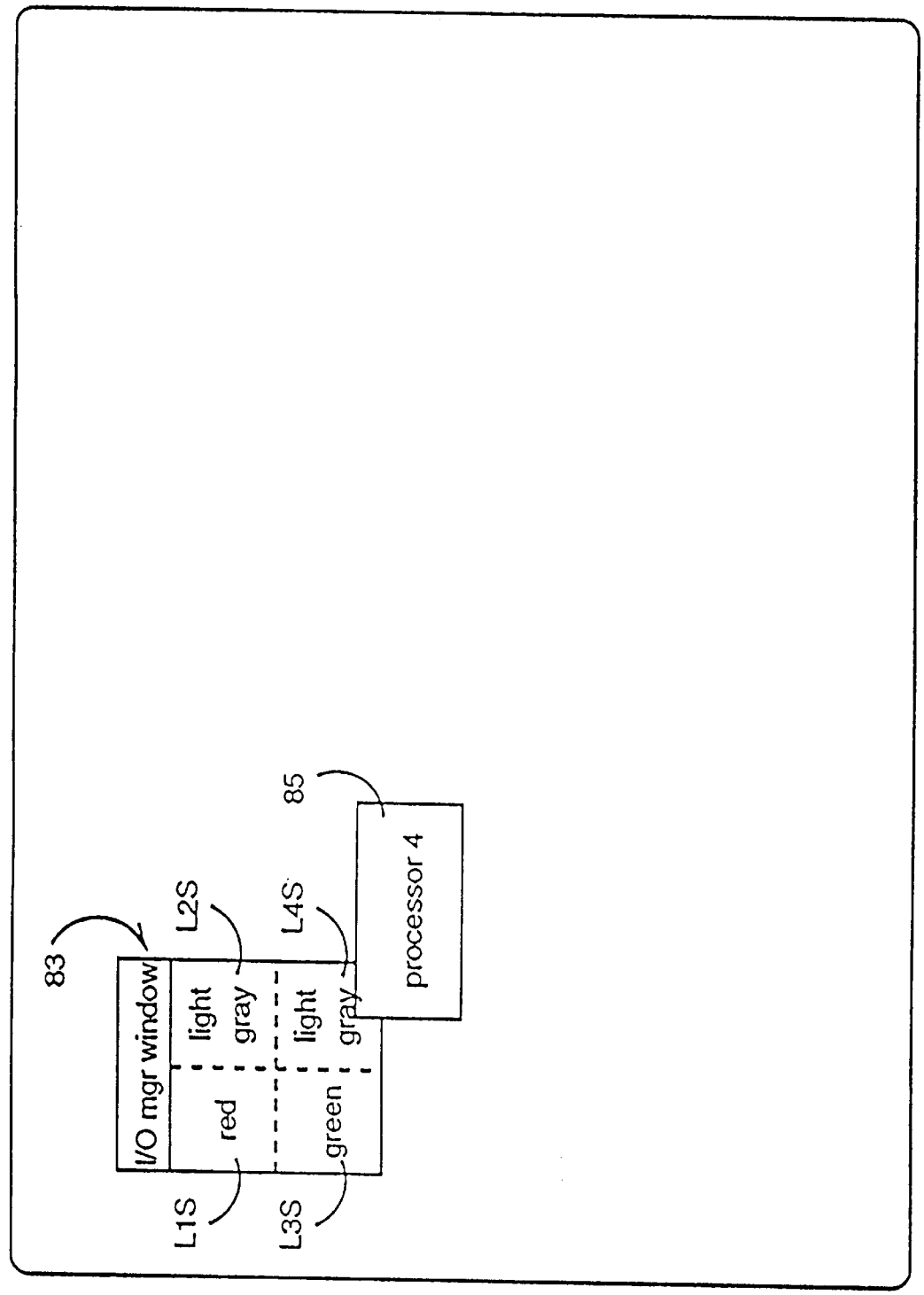
FIG. 5 is an illustrative view of the FIG. 4 user display screen at a particular stage of use.

When the program is loaded, the multiprocessor shell notifies the I/O manager. The I/O manager then changes the color of the I/O status indicators which correspond to running tasks to light gray. This is the graphical state shown for L2S and L4S in FIG. 5. Except for changes of color between "not running" and "running", thereafter the graphical state of the I/O status indicators changes only if the running program performs some text I/O operation. For example, assume that the program 45 running on processor number 3 performs an output operation. To do so, it calls the "output string" function in the I/O runtime library 47. This function uses the message passing kernel 13 to communicate with the I/O manager 43. The I/O manager cannot display the output, because it does not have a window for that purpose yet. Instead, it stores the output internally, and colors the I/O status indicator associated with the outputting processor green. In the example of FIG. 5, processor number 3 did some output, so I/O status Indicator L3S is green. Likewise, when a processor performs an input operation, it calls the "input string" function. This sends a message to the I/O manager asking for input to this processor. If no prior input is available, the I/O manager colors the corresponding I/O status indicator red. In the example of FIG. 5, processor number 1 has asked for input, so I/O status indicator L1S is currently red. Note that it is possible that processor 1 first performed an output operation to prompt the user for input, turning L1S green, and only then performed the input operation, turning L1S red. The I/O status indicators do not maintain history, they just show the current I/O status.

In case the user is confused by the different colors of the different VLEDs, and wants to know which processor any particular one represents, the mouse is used to point at a certain I/O status indicator (or even to any other VLED assigned to represent the same task), and then the designated mouse button is pressed. This action causes a callback in the I/O manager. The callback function creates a temporary popup window that identifies the processor associated with the pointed VLED. FIG. 5 shows the screen when the user asks to identify I/O status indicator L4S. The popup window 85 says that it represents processor number 4.

in order to actually read the output or type some input, the user must open a text window to the processor. To do so, the mouse is used to point at the I/O status indicator representing the task (or processor) in question, and the designated mouse button is pressed. This causes another callback to be invoked in the I/O manager. This callback requests the X server for a new window. If there is any text stored internally for this processor, from previous output and/or input activity, it is displayed in the window. At the same time, the I/O status indicator representing the task (or processor) is colored white to signify that this processor now has an open window for I/O.

Figure 6:
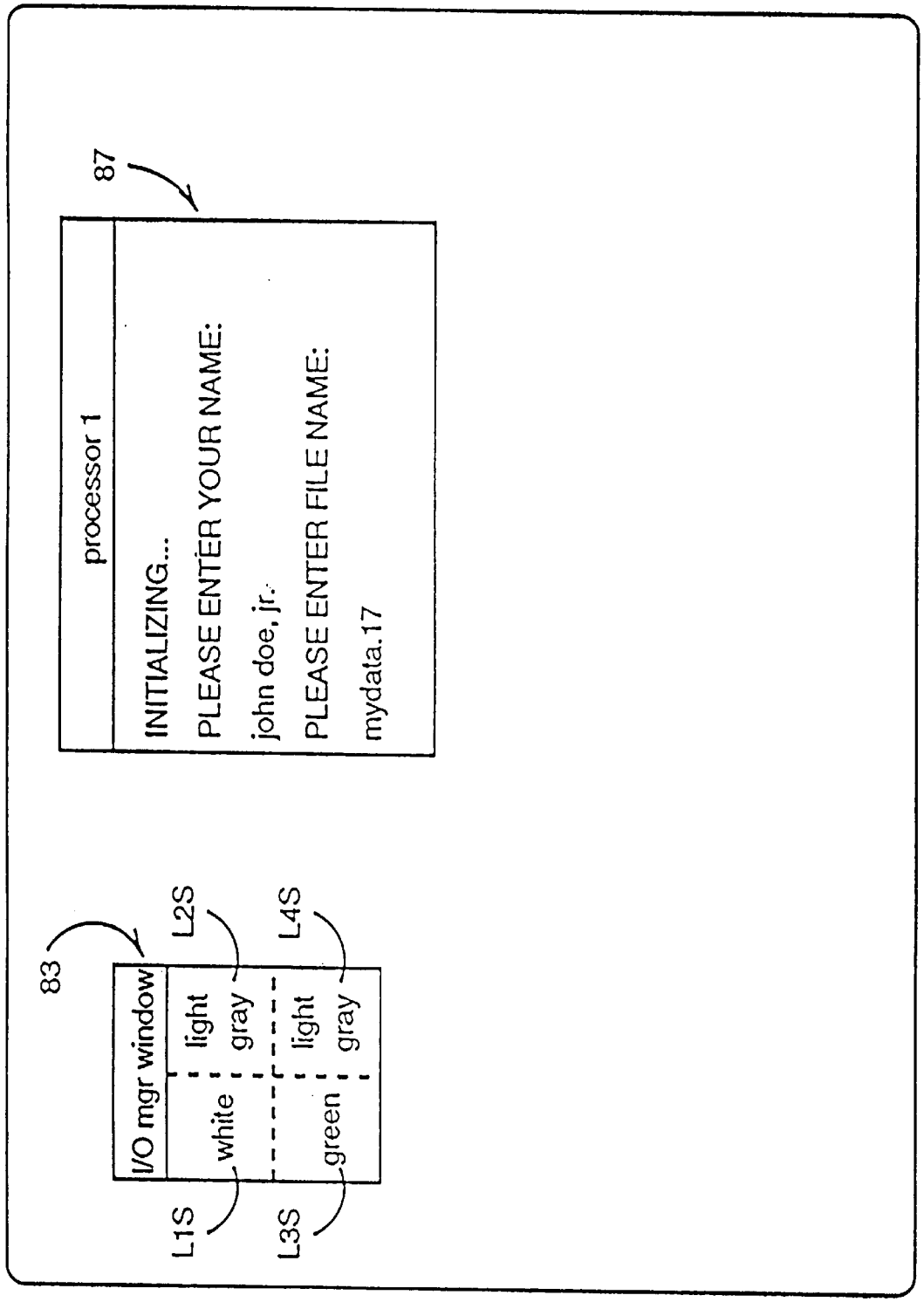
FIG. 6 is an illustrative view of the FIG. 4 user display screen at another stage of use in which an I/O window has been opened.
Figure 7:
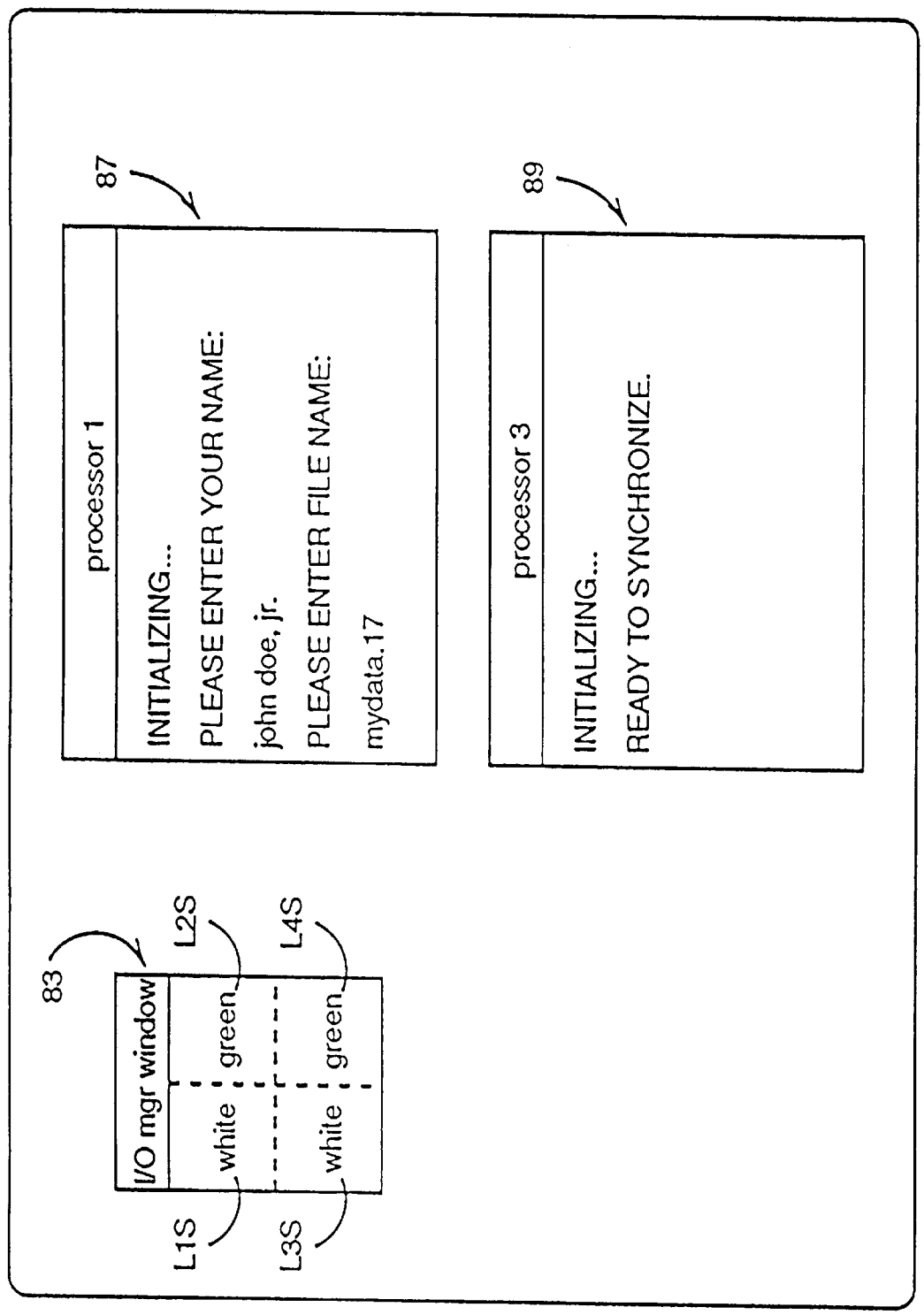
FIG. 7 is an illustrative view of the FIG. 4 user display screen at still another stage of use in which two I/O windows have been opened.

FIG. 6 shows the screen when an I/O window 87 is opened to processor number 1. Continuing with the above example, processor number 1 had done some output and then requested input. Thus when the window is opened, the first line (the output) appears in it. The user then uses the mouse to shift focus to this window, and types in some input. When the user hits the return key, a callback is revoked in the I/O manager. This callback issues an X function call to retrieve the text from the window. As processor 1 had already requested input, the input text is sent to it using the message passing kernel. Assume processor 1 now outputs another line of text. When this reaches the I/O manager, it is displayed immediately, because there exists an open window for this processor. The I/O status indicator representing processor 1 does not change color in this case. As the programs running on the other processors also perform output, the I/O status indicators representing them also turn green. This is shown in FIG. 7. To see this output, the user uses the mouse to point at one of the I/O status indicators, and presses the designated button. This causes the appropriate callback in the I/O manager to be invoked. The callback uses the X server to create another window, and displays the output in it. In FIG. 7, a new window 89 has been opened for I/O with the task running on processor number 3.

Apart from text output, in a preferred embodiment of this invention, the application also has another form of output at its disposal. This other output feature is claimed more particularly in a separate application filed on the same day as this application by the same inventors entitled "COMPACT GRAPHICAL PARALLEL PROGRAM USER OUTPUT INTERFACE CONTROLLED DIRECTLY BY THE PARALLEL PROGRAM", Ser. No. 07/965,591. Since the preferred embodiment of this invention however includes the invention claimed in this other co-pending application, both are described in detail herein. In accordance with this further feature claimed in this co-pending application, an application program can request additional VLEDs to be displayed, and can then set them to various colors. For example, instead of writing out the text "INITIALIZING . . . ", the program could color a designated additional VLED in blue.

To exercise this option, the application program must first request more VLEDs. This is done by calling the I/O library function that sets the number of VLEDs. This function sends a message to this effect to the I/O manager. The I/O manager then interacts with the X server to enlarge the VLED display window so as to accommodate the additional VLEDs. Any VLEDs that exist before the change retain their colors. For example, FIG. 8 shows the VLED display window 83 after the program has requested three more VLEDs. Each processor is now represented by a total of four VLEDs: three that can be used by the program, and a fourth that is used by the I/O manager to display the status of text I/O, as described above.

Once the required VLEDs have been created, the application can change their color by calling the "color VLED" function from the I/O runtime library. This function sends a message to the I/O manager, telling it which VLED to color and in what color. For example, assume the task running on processor number 3 asked that VLED number 1 be colored blue. The effect is shown in FIG. 8, where the I/O manager has used the X server to change the color of L31, which is the first VLED of those representing processor number 3.

Detailed Description of a Preferred Implementation

A preferred embodiment of the invention is shown in FIG. 3. The hardware platform includes three components: a workstation 3 where the user logs on and issues commands, a multiprocessor 1 that is used to execute parallel programs, and an X terminal 7 supporting the X window system, through which the user interacts with the workstation. The software implementing the invention has two main components: a runtime library 47 that is linked with the application program 45 on the multiprocessor, and an independent load module that implements the I/O manager functions 43 on the user's workstation. The two parts communicate using whatever means are available, preferably some message passing kernel. A message passing kernel 13 is shown on the multiprocessor elements and on the workstation. The I/O manager module controls the display on the user's X terminal by calling the X library 49, which sends commands to the X server 77 running on the X terminal. User input travels along the opposite route: it is caught by the X server which sends it to the X library in the form of events. When the I/O manager asks the X library for the next event, it gets the input.

I/O Runtime Library

The runtime library 47 is simple and straightforward. It provides the application 45 with a set of function calls to perform tasks related to terminal I/O, as listed below. When a function is called, the runtime library uses the message passing kernel 13 to send a message with the relevant data to to I/O manager component 43.

The following description of the available functions delineates the messages that are sent to the I/O manager module, and gives a sketchy description of what the I/O manager module does when it receives these messages. A more detailed description of the I/O manager module is given in the next section.

Output a string of text. The text is sent to the I/O manager component. If the outputing processor has an open window, the text is displayed immediately. If not, it is stored and the user is notified by turning the I/O status indicator VLED green.

Input a string of text. A message with the requested length is sent to the I/O manager component. If this processor has buffered input, the request is satisfied immediately. If not, it is stored and the user is notified by turning the I/O status indicator VLED red.

Open a text window. A message with the request code is sent to the I/O manager component. If the requesting processor does not have an open window, one is opened.

Close a text window. A message with the request code is sent to the I/O manager component. If the requesting processor has an open window, it is closed.

Set the color of a VLED. The VLED number and the color are sent. The I/O manager component identifies the VLED by its number and the task (or processor) that the message came from, and sets it to the specified color.

Reset a VLED. This sets the VLED to its default color, which is gray. It is handled just like setting any other color.

Query the number of VLEDs. A message with the request code is sent to the I/O manager component. It responds with the number of VLEDs per processor in the display.

Set the number of VLEDs. A message with the requested number is sent to the I/O manager component. It changes the display accordingly.

I/O Manager Component

The I/O Manager component is composed of a number of modules, as shown in FIG. 9. The main module 101 contains the entry point of the whole I/O manager module. It causes the display to be created and then controls its functioning. The I/O manager's message interface module 104 receives the messages sent from the runtime library linked with the application via the message passing kernel, and forwards instructions to the other modules as appropriate. Three modules are involved in handling text I/O: the placement module 119 deals with the placement of windows on the screen; the X text events module 116 deals with the actual interaction with the X windows system in order to display and retrieve text; and the buffering module 122 handles the buffering required to implement input. Another three modules are used to implement the graphical element display (or VLED display): an initialization module 107 is used at initialization to create the VLED display; an arrangement module 110 is used to determine the arrangement of the portions of VLEDs representing each task and the arrangement of VLEDs in each of these portions; and a graphical element events module 113 is used to handle VLED events generated by the application and X events generated by the user.

Main Module 101

The main module starts by activating the initialization module via path 131 in order to create the display. The initialization module is described in more detail below. Then the main module enters the main loop, and continues to loop until the user shuts down the display. This loop is required because the display module must react to asynchronous interactions from both the user and the application. In each iteration of the loop, checks are made to determine whether an X event has occurred or a message has arrived. If an X event has occurred, it is allowed to execute. This usually involves the invocation of a function from the modules that handle text events via path 133 or VLED events via path 135. The message interface module 104 is checked via path 137 for messages. If a message has arrived from the application, it is forwarded to the relevant module for handling via path 139 or path 141 or path 143 or path 145 depending upon circumstances.

I/O Manager & Message Interface Module 104

The message interface module is responsible for checking for the arrival of messages, and for receiving them when they do arrive. These two functions are implemented together by a nonblocking receive function. Nonblocking is needed so as to return control to the main loop in the case that no messages actually arrive, and thus enable the handling of additional X events.

Recall that messages reflect calls from the application to the runtime library. This module manages the activities resulting from such function calls. When a message is received it is handled as follows:

Text output - - - to the text handling module 116 via path 139. If the I/O status indicator VLED should be colored to notify the user of new output that is waiting to be seen, the VLED events module 113 is involved as well via path 143.

Text input - - - to the text buffering module 122 via path 141. If the I/O status indicator VLED should be colored to notify the user of a new request for input, the VLED events module 113 is involved as well via path 143.

Open or close a text window - - - the instruction itself is forwarded to the text handling module 116 via path 139, and the VLED events module 113 is instructed to change the color of the I/O status indicator VLED via path 143.

Set (or reset) the color of a VLED - - - to the VLED events module 113 via path 143.

Query the number of VLEDs - - - the reply is sent directly, without invoking any other module.

Change the number of VLEDs - - - use the arrangement module 110 to find an arrangement for the new number of VLEDs via path 145.

Display Initialization Module 107

This module is responsible for setting up the display. This includes opening the connection with the X server and creating the window used for the VLEDs. As part of this process, the arrangement module 110 is used via path 147 to determine the arrangement of the VLEDs for each task and the arrangement of tasks; new arrangements are created only if the number of VLEDs is changed. Then callback functions are attached to the window, to handle exposure, resizing, and user input events. The functions themselves are in the VLED events module 113 described in more detail below.

Arrangement Module 110

This module implements the policy of how the display is arranged. It is invoked at initialization, and thereafter only if the number of VLEDs is changed. When invoked, it produces three outputs:

The arrangement of the tasks (or processors): how many rows by how many columns. This is preferably as close to a square as possible.

The arrangement of the VLEDs belonging to each task (or processor): how many rows by how many columns. This too is preferably as close to a square as possible.

The size of each VLED. This cannot be so small that it can't be seen, but also not so big as to take up too much space on the screen.

VLED Events Module 113

This module contains two types of functions: those that implement application requests, and those that react to X events generated by the user. The functions that deal with user requests are simple, and just color the specified VLED in the specified color. The functions that respond to X events include the following:

Handle an exposure event by redrawing all the VLEDs.

Handle a resizing event by checking that the new size is legitimate, and correcting it if not.

Handle user commands by calling the appropriate function. Most of these are functions in the VLED events module itself, but some commands affect the text events module 116 via path 149, the message interface module 104 via path 159, and the buffering module 122 via path 161. The commands are described in more detail below in the "User Commands" section.

X Text Module 116

This module handles all the interactions with the X windows system regarding the text windows used for I/O by the different tasks (or processors). This includes two types of operations. The first is the actual creation and destruction of these windows. Windows are created in response to a user command via path 149 or a request from the application via path 139. When created for the first time, the placement module 119 also is used via path 151 to decide where on the screen to place the new window. If it is destroyed and recreated later, the same place is used.

The second type of operations are those that display text in the window for output, and retrieve text from the window for input. If output is done but the relevant window is not open, the text is stored for future display when the window is eventually opened. The handling of input typed by the user depends on whether or not input has been requested by the program. If an outstanding request is in effect, the input is sent to the requesting processor via path 153 to the message interface module 104. If the input was not requested, it is forwarded to the buffering module 122 via path 155 for matching with future input requests from the application.

Placement Module 119

This module mimics a tiled window manager. It keeps track of the location of the VLED display on the screen, and of the location of the various text windows. When a new window is opened, it is placed so as not to occlude the VLED display or any of the previous windows if at all possible.

Input Buffering Module 122

This module does the actual interfacing between two asynchronous entities: the running program and the user. If the program requests input but the user hasn't typed any in yet, the request is buffered via path 141 until some input is typed in. If input is already buffered, it is used to satisfy the request via path 157. If the user types in text before it is requested, the text is buffered via path 155 until it is requested by the task.

USER COMMANDS

The user can control the display to a certain degree using the following commands, which translate to a callback function call in the VLED events module 113. The commands are given by typing a designated letter or pressing a mouse button when the focus is on the VLED display.

Open and close text windows. This is done by placing the mouse on any VLED associated with a certain task (or processor), and then giving the command. If the task (or processor) does not have an open window, one is opened for it. If it does, the window is closed. This requires the VLED events module to invoke the text events module via path 149 in FIG. 9.

Identify processor to which a VLED belongs. Again, the VLED is identified by placing the mouse on it.

Broadcast. Users can create a temporary window in which they can type input that will be sent to all the tasks (or processors). This is functionally equivalent to opening private windows to all the tasks (or processors), and typing the same text in each. The input is sent directly to the tasks via path 159 or is buffered via path 161, depending on whether or not it was requested by each one. In addition, it is echoed in the text windows via path 149.

Close. All open text windows are closed. This requires the VLED events module 113 to invoke the text events module 116 via path 149.

Change display mode. There are two display modes for the VLEDs square, where both the processors and the VLEDs of each processor are arranged in a square-like rectangle, and rows, where the VLEDs of each processor are arranged in a row and the tasks (or processors) are arranged in a column, one above the other (if there is not enough space in the screen, more than one column may be used). The square mode is better for massively parallel systems, where each processor has a very small number of VLEDs (e.g. only one). It allows the user to immediately pick out those processors with abnormally colored VLEDs, which indicate a problem condition. The rows mode is better for smaller machines, especially if each processor has many different VLEDs, because the same VLEDs from all the processors are aligned one above the other.

This command is implemented by changing the arrangement of tasks (or processors) and VLEDs that was selected by the arrangement module 110.

Set VLED arrangement. In the square mode, the system has some freedom in choosing exactly how to arrange the tasks (or processors) and VLEDs (i.e. how many rows and columns to use). The user may override the system's choice, and dictate another arrangement.

VLED selection. In the square mode, the user may select to see only a certain VLED from each processor, rather than all VLEDs, to get a better picture of how this VLED reflects the status of the whole system.

Clear. All the text in all the windows is erased, and so is all the text that is stored for processors that do not currently have open windows. This requires the VLED events module to invoke the text events module via path 149. All VLEDs are changed to their original "off" color (which is gray in this example).

Obtain help. The help window displays a summary of these commands.

Scalability

With very large numbers tasks (or processors or threads), it would be impossible to represent each one by an independent VLED. Luckily, users would not be able to assimilate the information in so many independent VLEDs anyway. Actually, users only need to see those that are different from the general behavior. Therefore it is possible to scale to ever larger numbers by using a condensed representative panel or array of VLEDs, where each VLED represents a set of tasks (or processors or threads), and its color is determined by the minority value rather than by the majority consensus. Thus all extra-ordinary processors will show up. The user would then be able to zoom in on those processors to investigate their status in greater detail.

Another aspect of scalability is the constant total I/O rate that can be handled by the I/O manager module. This means that the I/O rate per task (or processor) is inversely proportional to the system size. Note, however, that the rate at which a human user can handle I/O is even more limited. Therefore the problem can be solved by using a lazy output mechanism: output can be buffered at the tasks (or processors), rather than being sent for display immediately when produced. It is then actually sent only if the user requests it by opening a window to that task (or processor).

While the invention has been described in terms of a preferred embodiment, those skilled in the art will recognize that the invention can be practiced with modification within the spirit and scope of the appended claims.

Having thus described out invention, what we claim as new and desire to secure by Letters Patent is as follows:

1. A user interface for managing text I/O between a user and a parallel program, comprising:
   a user terminal for communicating with a parallel processing system executing a parallel program, said parallel program including a plurality of individual tasks which may be executing in parallel with each other, said user terminal having a display screen;
   an I/O status manager for continuously displaying an array of text I/O status indicators on said screen, each one of said tasks corresponding uniquely to a different one of said text I/O status indicators, each of said text I/O status indicators having a first designated graphical state for indicating that a particular task corresponding to said each text I/O status indicator has text output that has not been displayed yet on said screen and a second designated graphical state for indicating that said particular task is requesting text input from said user terminal; and
   a text I/O manager controllable by a user at said terminal for opening an I/O window in said screen corresponding to any selected text I/O status indicator, said I/O window displaying text I/O for the particular task which corresponds to said selected text I/O status indicator.

2. A user interface as defined in claim 1 wherein each of said text I/O status indicators is a geometrically shaped spot at a particularly defined position relative to other ones of said text I/O status indicators.

3. A user interface as defined in claim 2 wherein said geometrical shape is a square.

4. A user interface as defined in claim 1 wherein said first designated graphical state for any said text I/O status indicator is a first particular designated color for said text I/O status indicator and said second designated graphical state for any said text I/O status indicator is a second particular designated color for said text I/O status indicator.

5. A user interface as defined in claim 1 wherein each of said tasks are executed on a separate processing element in said parallel processing system, each of said text I/O status indicators thereby corresponding to a particular one of said processing elements.

6. A user interface as defined in claim 1 wherein each of said text I/O status indicators has a third designated graphical state for indicating that an I/O window has been opened corresponding to said each text I/O status indicator.

7. A user interface as defined in claim 6 wherein each of said text I/O status indicators has a fourth designated graphical state for indicating that said particular task corresponding to said each text I/O status indicator is running on said parallel processing system.

8. A user interface as defined in claim 7 wherein each of said text I/O status indicators has a fifth designated graphical state for indicating that said particular task corresponding to said each text I/O status indicator either has not yet started running on said parallel processing system or has already terminated running on said parallel processing system.

9. A user interface as defined in claim 1 wherein said I/O status manager can display an alternative array of text I/O status indicators, each of said text I/O status indicators in said alternative array corresponding with a set of tasks, each of said text I/O status indicators in said alternative array having a first graphical state for indicating that one or more of the particular tasks corresponding with that particular text I/O status indicator has text output that has not been displayed yet on said screen and a second designated graphical state for indicating that one or more of said particular tasks is requesting text input from said user terminal.

10. A user interface as defined in claim 1 wherein a user may move a cursor on top of any desired text I/O status indicator and then signal said text I/O manager to cause a message to appear on said screen identifying the particular task corresponding with said desired text I/O status indicator.

11. A user interface as defined in claim 1 wherein said text I/O manager is controlled by a user to open an I/O window to any desired one of said tasks by moving a cursor on top of the particular text I/O status indicator corresponding with said desired task and then signalling said text I/O manager.

12. A user interface as defined in claim 11 wherein said cursor is moved and said text I/O manager is signalled by using a mouse pointer device.

13. A user interface as defined in claim 1 wherein said text I/O manager is controllable by a user at said terminal to close an existing I/O window.

14. A user interface as defined in claim 13 wherein said text I/O manager is controllable by a user at said terminal to close all existing I/O windows at the same time.

15. A user interface as defined in claim 1 wherein said text I/O manager is controllable by a user at said terminal to open a multiplicity of I/O windows corresponding each to a different one of said tasks.

16. A user interface as defined in claim 1 wherein said text I/O manager is controllable by a user at said terminal to open a broadcast text I/O window in which text may be entered by said user and said entered text is thereby automatically sent to each of said tasks as if a separate window had been opened to each of said tasks and said entered text had been entered into each of said opened windows.

17. A user interface as defined in claim 1 wherein said text I/O status indicators each look to a user like a colored square.

18. A user interface as defined in claim 1 wherein said text I/O status indicators are arranged in a line.

19. A user interface as defined in claim 1 wherein said text I/O status indicators are arranged as closely as possible into a rectangular array.

20. A user interface as defined in claim 1 wherein said text I/O status indicators are part of an array of graphical elements that includes graphical elements not indicative of text I/O status.

21. A user interface as defined in claim 20 wherein said array of graphical elements includes at least one additional graphical element corresponding to each of said tasks for providing a graphical state coded output to a user from each of said tasks corresponding with said additional graphical elements.

22. A user interface as defined in claim 1 wherein said text output that has not been displayed yet on said screen is buffered until display by said text I/O manager.

23. A user interface as defined in claim 1 wherein said text output that has not been displayed yet on said screen is buffered until display by said parallel processing system.

24. A user interface as defined in claim 1 wherein said text I/O manager is controllable by a user at said terminal to reset all of said text I/O status indicators to a predetermined graphical state.

25. A user interface as defined in claim 1 wherein said parallel processing system is a massively parallel computer system.

26. A user interface for managing text I/O between a user and a massively parallel program, comprising:

- a user terminal for communicating with a massively parallel processing system executing a massively parallel program, said massively parallel program including a large multiplicity of individual tasks which may be executing in parallel with each other, said user terminal having a display screen;
- an I/O status manager for continuously displaying an array of text I/O status indicators on said screen, each one of said tasks corresponding to one of said text I/O status indicators, each of said text I/O status indicators having a first graphical state for indicating that a task corresponding to said each text I/O status indicator is requesting text input from said user terminal and a second designated graphical state for indicating instead that a task corresponding to said each text I/O status indicator has text output that has not been displayed yet on said screen; and
- a text I/O manager controllable by a user at said terminal for opening an I/O window in said screen that corresponds to a task indicated by a selected text I/O status indicator in a first or second graphical state, said I/O window displaying text I/O for said indicated task which corresponds to said selected text I/O status indicator.

* * * * *